W. J. HUND.
PRODUCTION OF PHENOLS FROM REDWOOD.
APPLICATION FILED APR. 25, 1917.
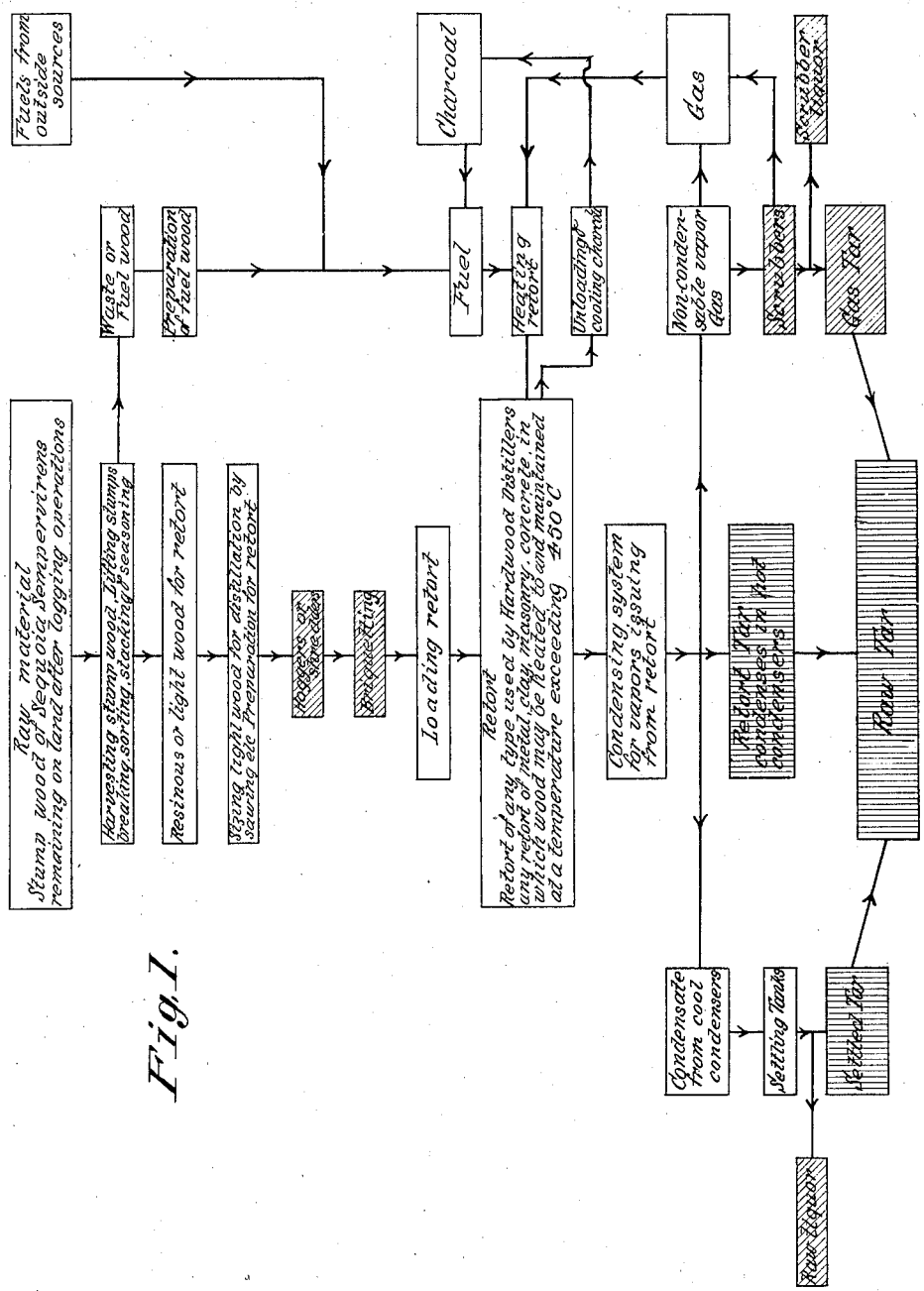
Fig. I.

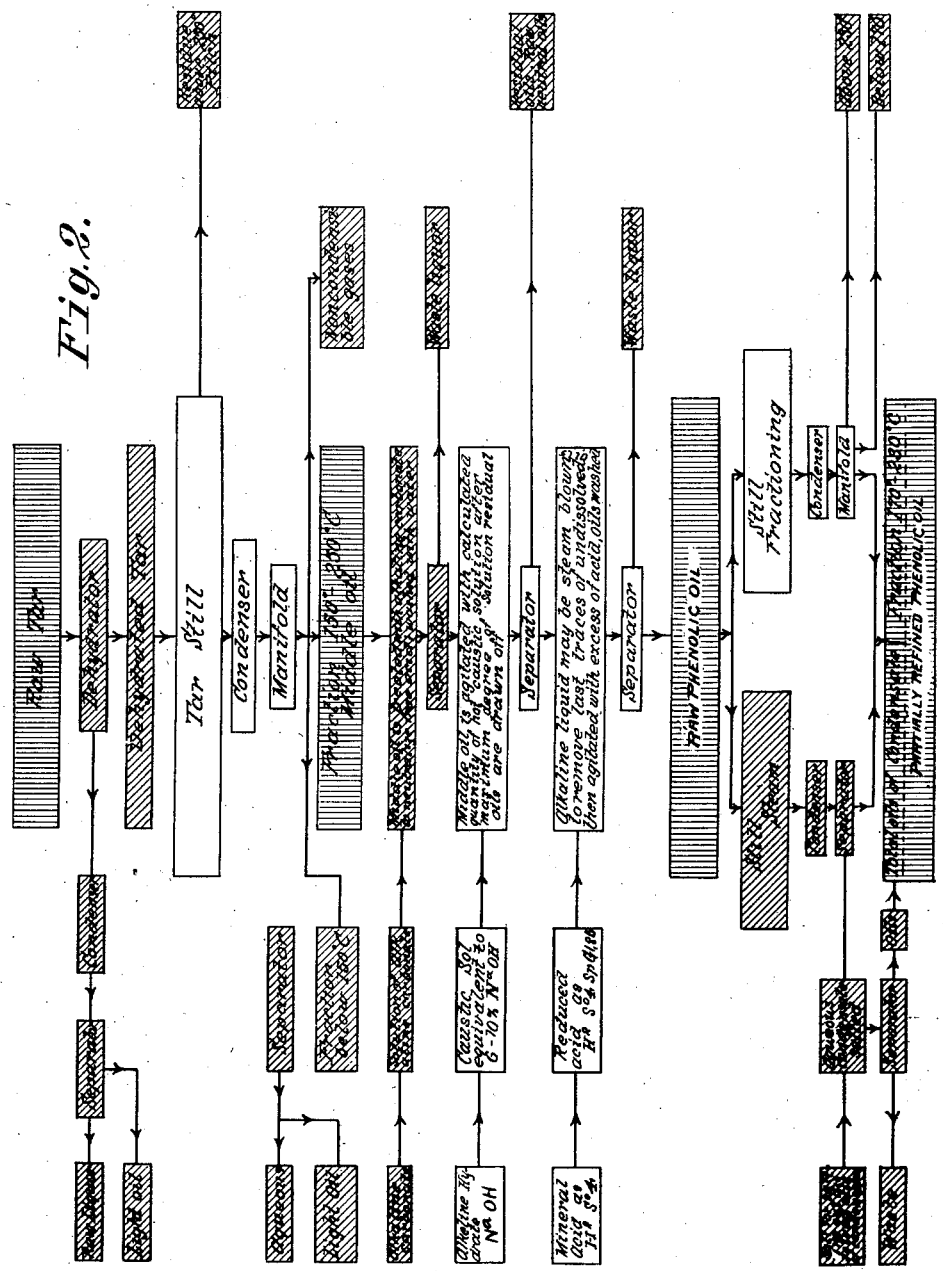

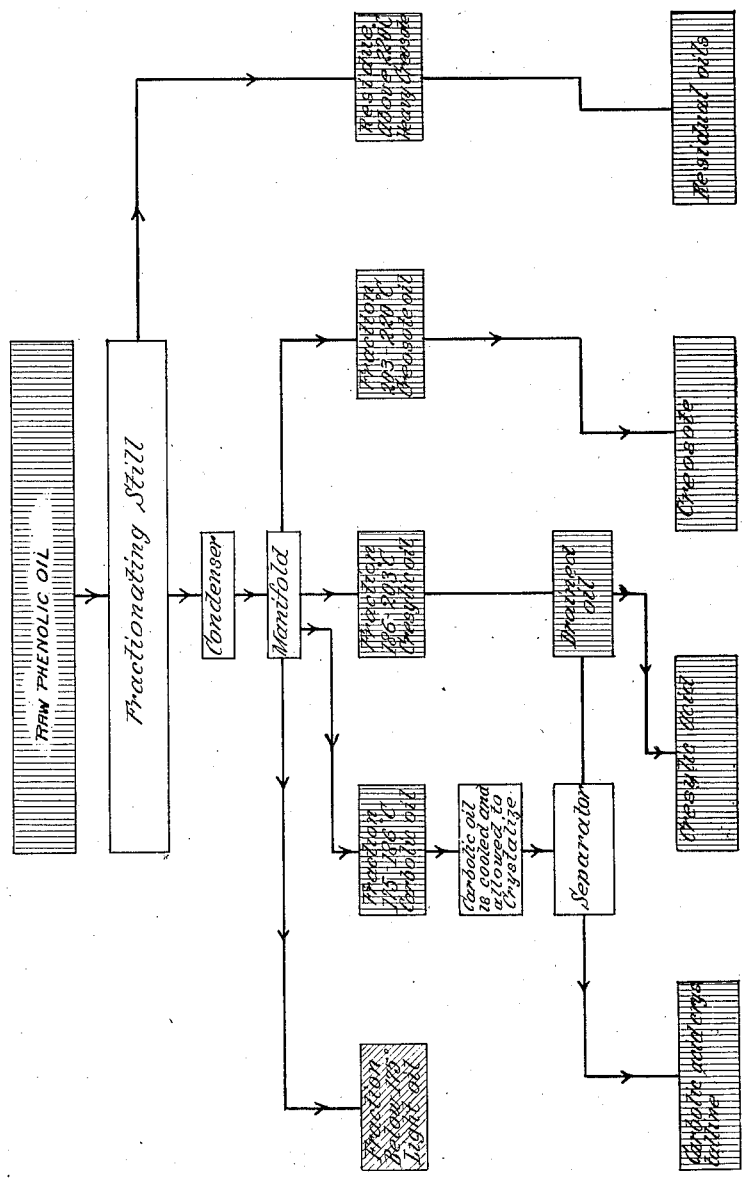

UNITED STATES PATENT OFFICE.

WALTER J. HUND, OF ROSS, CALIFORNIA.

PRODUCTION OF PHENOLS FROM REDWOOD.

1,365,407.      Specification of Letters Patent.      Patented Jan. 11, 1921.

Application filed April 25, 1917. Serial No. 164,438.

*To all whom it may concern:*

Be it known that I, WALTER J. HUND, a citizen of the United States, residing at Ross, in the county of Marin and State of California, have invented new and useful Improvements in the Production of Phenols from Redwood, of which the following is a specification.

This invention relates to the production of valuable phenoloid bodies; and has for its object to produce a new natural combination of valuable phenols by the destructive distillation of the resin of redwood.

The principal sources of natural phenol are coal and wood tars. A coal tar is typified by a large proportion of phenol and the three cresols. A wood tar is typified by large proportions of guaiacol and creosol. Coal tar yields from 8 to 25 per cent. of the so-called middle oil, of which from 30 to 55 per cent. is naphthalene. The rest is principally carbolic acid and the cresols, with some indifferent oils, the carbolic acid occurring to the extent of from 3 to 15 per cent. of the middle oil, or from 0.3 to 3.0 per cent. of the coal tar.

In reference to the recovery of refined phenols from coal tar sources, it may be stated that a considerable complication to the processes is the removal of the napthalene. Not only do the middle oils have to be pressed to free them from the greater part of naphthalene content, but in order to obtain a final crystalline phenol free from naphthalene, the oil must be treated chemically before fractionation, and further after fractionation, in addition to several redistillations.

Wood tars may be roughly divided into two types, namely, resinous wood tars and hardwood tars. Hardwoods are distilled for oxygenated products in preference to soft woods, because they give larger yields of these bodies, including phenols. About 20 per cent. of hardwood tar is phenolic, of which on the average 65 per cent. is guaiacol and creosol, 25 per cent. carbolic acid and cresols, or, in other words, 13 and 5 per cent., respectively, of the tar.

Tars from resinous woods distilled commercially, though the yield of tar as such is greater than from hardwoods, contain a much smaller proportion of phenolic bodies. Thus while there might be a considerable yield of middle oil, only a small portion is phenolic and soluble in alkali.

Redwood has no indication of being a wood suitable for destructive distillation for the reason that it is a soft wood and a resinous wood, and the only resinous woods heretofore valuable for distillation purposes were those rich in turpentine, which is practically absent in redwood. However, I have found as a result of many experiments that when the resin of redwood is subjected to destructive distillation in a manner similar to that practised with hardwood it produces a tar which contains large proportions of phenol and the three cresols still having considerable proportions of guaiacol and creosol. It is a natural intermediate between a coal tar creosote and a wood tar creosote, with the advantage over the former in that it has no naphthalene or coal tar odor and the advantage over the latter in that it contains large proportions of valuable and easily isolated low-boiling phenols. The relative proportions of the individual phenols derived from redwood tar are different radically from the proportions of the individual phenols making up any other natural combination from any of the other known tars from any source whatsoever.

The resin of the redwood is capable of producing commercially a higher grade of natural crystalline carbolic acid or cresylic acid than is obtainable from any other known natural source. The carbolic acid and cresylic acid from this source are not contaminated with naphthalene or sulfur compounds and possess a distinct and different odor from those produced from coal tars.

Redwood, or *Sequoia sempervirens*, or coast redwood is a conifer, of the *Abietineæ* or *Pinaceæ*, sub. *Taxideneæ*, a soft or resinous wood, of which an extensive use is made as a timber wood. Its needles, etc., contain volatile oil, the nature of which has been recorded in the case of the closely related *Sequoia gigantea*, the name "sequojene" having been given to a solid hydrocarbon typical to the oil. The roots of both sequoias are highly resinous in character, and those of the *Sequoia sempervirens* will yield to alcoholic extraction a resinous body which exists in the richest portions of the lightwood to the extent of 40 per cent. Nothing is on record of any attempts having been made to distil this wood in the manner of hardwoods or other resinous woods. This can be attributed to the fact that hardwoods have been distilled for the production of alcohol, acetone and acetates, of which products hardwoods give a maximum yield; and that resinous woods have been distilled for their yield of turpentine and rosin oils.

Ordinary rosin, or colophony, or the resins of the pines, upon destructive distillation will yield only traces of phenolic bodies. The resin of redwood, on the other hand, will yield a large proportion of decomposition products of a phenolic character. Samples of redwood resin distilled will yield oils, a large proportion of which is phenolic containing among other phenoloids catechol and homocatechol. Redwood resin extracted from lightwood is brownish black in color, its powder a light brown reddish gray. It is translucent in thin flakes and shows a beautiful claret red color in transmitted light. It shows distinct differences from pine resins in physical and chemical properties.

If the lightwood is subjected to a process of destructive distillation in the identical manner practised with hardwoods or other woods, a tar is obtained that possesses different characteristics than tars from other woods.

The yield of redwood tar corresponds to that of other resinous woods, about 10 per cent. of the wood distilled, which is greater than the yield of tar from hardwoods. It yields about 35 to 45 per cent. of middle oil taken between 150 and 250 degrees, of which from 50 to 60 per cent. is phenolic. The phenolic oils comprising from 17.5 to 27.0 per cent. of the tar will yield about 60 per cent. of phenols boiling below 200° and about 35 per cent. boiling between 200° and 220°. Of the low boiling phenols about 25 per cent. is crystallizable carbolic acid, which is about 15 per cent. of the total phenols, 7.5 to 8 per cent. of the middle oil, 2.5 to 3.6 per cent. of the tar.

The tar contains no naphthalene, or at best only traces. It contains, likewise, only traces of sulfur compounds. By simple fractional distillation it is easily possible to obtain a carbolic acid, crystalline and of a high degree of purity. The color of this crystalline carbolic is a snow white, and does not change in the manner of phenol from coal tar sources. The coal tar odor is absent, and the phenol has the more pleasing hardwood creosote odor.

The same applies to the cresols which can readily be isolated colorless, free from the usual coal tar odor, with a hardwood creosote odor instead. About 35 per cent. of the phenol from redwood tar consists of the cresols, or about 20 per cent. of the total phenols, 10 per cent. of the middle oil and 5 per cent. of the tar.

About 35 per cent. of the phenols are guaiacol and creosol, the latter occurring in the larger proportion, which phenoloids occur to about the same extent as the cresols.

In the accompanying drawings:

Figure 1 shows diagrammatically the first group of steps employed in my process.

Fig. 2 shows the second group.

Fig. 3 shows the third group.

The three groups are to be read in sequence.

In the drawings the unshaded rectangles indicate materials, apparatus and process steps necessary for the production of phenolic bodies in accordance with the preferred form of my invention; the diagonally shaded rectangles indicate materials, apparatus and process steps not necessary but still advisable for recovering the by-products; and the vertically shaded rectangles indicate commercially utilizable phenoloid bodies or products, the value of which is due to phenoloid characteristics.

I take a quantity of selected wood obtained from the broken-up stumps of *Sequoia sempervirens* or redwood, the selected wood being that which in the case of resinous woods is known as "light-wood," or wood rich in resins. A cord of this wood will weigh approximately 4,000 pounds. I prepare this wood in the following manner:

I season it well and cause it to dry, either in the air or in kilns, so as to allow the evaporation of most of the water it may contain. When it has become as dry as is practicable, I prepare it further for the retort, in that I saw, or chip, shred or hog and compress the comminuted wood into briquets, or in other ways physically treat the wood in order that it may possess a definite degree of uniformity. It is desirable to reduce the wood to a definite degree of uniformity in order to allow a better control in the subsequent distillation of the prepared wood.

I next subject the prepared wood to destructive distillation. I pack the wood in a vessel of suitable construction in which it may be subjected to a temperature which may be in excess of 450° C., thereby causing it to decompose, from which vessel the volatile products may issue freely to and through a condensing system wherein that portion of the condensate oily in character and known as "tar" is gathered and separated from other decomposition products. I can accomplish the production of the tar with any tar production and recovery process used in the retort, oven or kiln systems of hardwood distillation.

In this way I obtain from each cord of wood 50 to 60 gallons of tar with a specific gravity of about 1.11. This tar further has approximately the usual physical characteristics of a wood tar.

I then distil the oils of the tar from its pitch making use of any suitable tar still, and condense and collect separately the oils distilling over between 150° and 250° centigrade. I call this oil the middle oil from redwood tar and obtain from 20 to 25 gallons of it. It has an empyreumatic odor like similar fractions obtainable from hardwood tars, and though it may at first have a pale or dark yellow amber color, it rapidly darkens to a dark reddish brown soon after distillation.

I next determine the amount of alkali-soluble material of the middle oil. I do this by taking 10 cubic centimeters of the oil in a graduated tube, and add gradually four or five times as much, or 40 to 50 cubic centimeters of a 10 per cent. solution of sodium hydroxid. I then close the tube and agitate it well, whereupon the alkali-soluble material will be completely dissolved by the alkaline liquid. Upon standing the insoluble oils will gather in a separate stratum. When the separation of the alkaline liquid and the undissolved oil is complete, I read the volume of the undissolved oil, and subtract this volume from 10 cubic centimeters, and the figure obtained represents the volume of alkali soluble material in each ten cubic centimeters of the middle oil. Knowing the volume of alkali soluble material in the oil, I calculate the minimum amount of a known solution of an alkaline hydrate necessary to dissolve the alkali-soluble material of the middle oil.

I then place the middle oil in a suitable vessel, wherein it is agitated with the calculated amount of the warm solution of an alkaline hydrate, until solution is complete. The solution of an alkaline hydrate should approximate a strength of from 6 to 10 per cent. sodium hydrate, or a specific gravity of from 1.10 to 1.15. When the liquids have been thoroughly mixed and agitated and the soluble oils have gone into solution, I draw off the undissolved oils and treat the alkaline liquor with a slight excess of a dilute acid solution, for instance a solution of sulfuric acid, corresponding to about 12 per cent. acid. The quantity of acid added can be calculated or neutralization may be judged by obvious color changes in the treated liquor. This acid treatment of the alkaline liquor will liberate the dissolved oils, which are then withdrawn and washed with water enough to remove the excess of acid if any is present. In this way I obtain from 10 to 15 gallons of an oil entirely phenolic in character, which contains various phenols in different proportions than any total phenolic oil from any other known tar. To distinguish this redwood phenolic oil from other phenolic tar oils I call it "sequojol, raw."

I then subject the redwood phenolic oil to distillation, either direct, in which case I collect the portion distilling over between 170° and 230° centigrade, or with steam, in which case I collect the total oils of the condensate separating out upon saturating the aqueous portion of the distillate with a water-soluble salt, such as sodium chlorid, calcium chlorid, sodium sulfate.

By subjecting this redwood phenolic oil still in its raw state to fractional distillation from a still of the type of the so-called "phenol still", I obtain precisely the following percentages of phenols:

*Table I.*

| | |
|---|---|
| From 178 to 186 degrees C. | 25 per cent. carbolic oil |
| From 186 to 195 degrees C. | 10 per cent. } cresylic oil |
| From 195 to 203 degrees C. | 20 per cent. |
| From 203 to 210 degrees C. | 8 per cent. } creosote oil |
| From 210 to 220 degrees C. | 14 per cent. |

(See Fig. 3.)

The yield of partially refined oil (indicated at the bottom of Fig. 2), from the raw redwood phenolic oil is about 85% or from 8.5 to 13 gallons for each cord of wood; the fractionation figures being approximately as follows:

*Table II.*

| | |
|---|---|
| From 178 to 186 degrees C. | 30 per cent. carbolic oil |
| From 186 to 195 degrees C. | 13 per cent. } cresylic oil |
| From 195 to 203 degrees C. | 25 per cent. |
| From 203 to 210 degrees C. | 9 per cent. } creosote oil |
| From 210 to 220 degrees C. | 17 per cent. |

The higher percentages of recoveries by the last-described method illustrated in Fig. 2, is due simply to the comparative crudeness of that process as against the first-described process Fig. 3, where the refinement and separation is final and complete. It is not to be understood that the two steps, or that the two methods are practised simultaneously or successively; they are simply alternative methods. The main thing in connection with the present discovery and invention is the production of the raw redwood phenolic oil; the very treatment of this raw redwood phenolic oil being more or less suggested by the nature of the derived products.

The first of the above-named fractions in Table I, to-wit: carbolic oil, when subjected to a low temperature, say 0 degrees centigrade, will solidify and is 80 per cent. or more "crystallizable phenol". I drain the crystallized phenol from its unsolidified oils, by means of a centrifugal machine, or other suitable means; the crystals so obtained are carbolic acid crystals. The oil drained from the crystals I add to the combined fractions 186°–195° and 195°–203°, and the resulting oil is cresylic acid. The combined fractions 203°–210° and 210°–220° constitute creosote.

The three last named phenolic products I obtain in the following amounts:

| | |
|---|---|
| Carbolic acid crystalline | 17 to 20 lbs. |
| Cresylic acid | 4 to 5 gallons |
| Creosote | 2 to 3 gallons |

This natural combination of phenols constitutes a commercial source of higher grade natural crystalline carbolic acid or cresylic acid than is obtainable from any other known natural source. There are no sulfur compounds or naphthalene contaminating the new natural combination and as a result thereof there is a larger yield of carbolic acid in the middle oil than in the case of a coal tar "carbolic" or "middle" oil. The redwood tar itself has a larger relative amount of carbolic acid than coal tar and there is an entire absence of coal tar odor with the presence of the more pleasing wood creosote odor in its stead. No special treatment of the carbolic acid is necessary to eliminate coloration propensities, inasmuch as the acid from this source will not readily discolor.

By using redwood tar instead of coal tar as a source for this purpose, I find that I can eliminate several of the purification processes now necessary and hitherto thought necessary in carbolic acid isolation from natural sources.

Having thus described my invention, what I claim and desire to secure by Letters Patent is—

1. The process of producing phenoloid bodies from redwood, which comprises heating comminuted resinous redwood in a retort at a temperature above 450° C., collecting the tar formed by such heating, fractioning out of the tar an oily distillate between 150° and 250° C., treating said oily distillate with caustic alkali solution whereby a portion thereof is dissolved, separating the mixed phenolic substances from the solution so formed and separating the phenolic compounds.

2. The production of phenolic oil from resinous redwood, which includes destructive distillation of the raw wood at temperatures exceeding 450° C., and subjecting the resulting raw redwood phenolic oil to fractional distillation to segregate the derived phenols.

3. The production of a new natural combination of valuable phenols which consists in the destructive distillation of the resin of redwood, without previously isolating the same from the wood, this destructive distillation being carried on at a temperature in excess of 450° C., distilling the raw tar thus formed, subjecting the middle oil thus fractionated at a temperature from 150° to 250° C to agitation with hot caustic alkali solution, drawing off the residual oils and treating the alkaline liquor with a slight excess of a dilute acid solution to liberate the dissolved oils and then withdrawing and washing said oils, the resulting product being a raw redwood phenolic oil.

4. The process of producing phenolic compounds, which comprises destructively distilling *Sequoia sempervirens* to produce tar, redistilling said tar, and collecting the fraction boiling between 150° and 250° C.

5. The process of producing phenolic compounds, which comprises destructively distilling *Sequoia sempervirens* to produce tar, redistilling said tar, and collecting the fraction boiling between 150° and 250° C., and separating from said fraction by solution and precipitation the mixed phenolic compounds contained therein.

6. The process of producing phenoloid bodies from redwood which consists in treating suitably comminuted resinous redwood in a retort at a temperature exceeding 450° C. to recover raw tar, fractioning out from the tar the middle oil at a temperature of 150° to 250° C., treating this middle oil with caustic alkali solution whereby some of the middle oil dissolves and separating the dissolved oil from the solution so formed.

7. In the process of obtaining phenolic compounds from redwood, the steps of destructively distilling the redwood at a temperature not much above 450° C., and collecting the tar so formed.

8. In the process of obtaining phenolic compounds from the wood of *Sequoia sempervirens*, the steps of destructively distilling the wood at a temperature not much above 450° C., collecting the tar so formed, distilling said tar and collecting the fraction containing the bulk of the phenolic compounds.

9. The cresote oil of redwood tar, which comprises the distillate of redwood tar recovered between the limits 150 to 250 deg. C., and which contains approximately 60 per cent. of phenols.

10. Redwood tar, consisting of the tar obtained by destructively distilling the wood of the *Sequoia sempervirens*, which tar contains approximately 30 per cent. of phenols.

11. The phenol of redwood tar which is obtained from redwood tar as set forth in claim 10, and which has the approximate composition:

Boiling between 178 and 186 deg............................ 25%
Boiling between 186 and 196 deg............................ 10
Boiling between 195 and 203 deg............................ 20
Boiling between 203 and 210 deg............................ 8
Boiling between 210 and 220 deg............................ 14

In testimony whereof I have hereunto set my hand in the presence of two subscribing witnesses.

WALTER J. HUND.

Witnesses:
 JOHN H. HERRING,
 W. W. HEALEY.